(12) United States Patent
Aberle

(10) Patent No.: US 10,780,950 B2
(45) Date of Patent: *Sep. 22, 2020

(54) SNOWMOBILE SKI DAMPENER

(71) Applicant: Ryan D. Aberle, Westminster, CO (US)

(72) Inventor: Ryan D. Aberle, Westminster, CO (US)

(73) Assignee: Ryan D. Aberle, Westminster, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/435,508

(22) Filed: Jun. 9, 2019

(65) Prior Publication Data

US 2019/0291819 A1 Sep. 26, 2019

Related U.S. Application Data

(63) Continuation of application No. 16/206,627, filed on Nov. 30, 2018, now Pat. No. 10,322,772, which is a
(Continued)

(51) Int. Cl.
*B62B 17/04* (2006.01)
*B62M 27/02* (2006.01)

(52) U.S. Cl.
CPC ......... *B62M 27/02* (2013.01); *B62K 2201/02* (2013.01); *B62M 2027/025* (2013.01); *B62M 2027/026* (2013.01)

(58) Field of Classification Search
CPC B62M 27/00; B62M 27/02; B62M 2027/026; B62M 2027/025
See application file for complete search history.

(56) References Cited

U.S. PATENT DOCUMENTS 3,982,597 A * 9/1976 Callaway ................ B62B 13/08
280/21.1
4,374,591 A 2/1983 Kobayashi
(Continued)

FOREIGN PATENT DOCUMENTS

EP 2 955 409 A1 12/2015

OTHER PUBLICATIONS

Swedish Dampeners; SnoWest (discussion thread from forum); Jan. 2, 2018; : https://www.snowest.com/forum/showthread.php?p=4106621#post4106621 16 pgs.
(Continued)

*Primary Examiner* — Brian L Swenson
(74) *Attorney, Agent, or Firm* — Holland & Hart LLP

(57) ABSTRACT

An improved snowmobile ski dampener for dampening articulation between a steering spindle and a snowmobile ski. The ski dampener may be constructed of an elastomeric material and include one or more progressive surfaces that progressively come in contact with a base surface of the steering spindle as progressively increased compressive loads are applied between the steering spindle and snowmobile ski. As the progressive surfaces come in contact with the base surface, the shape factor of the ski dampener may change (e.g., increase), reducing compressive strain for a given compressive stress. Various design and material characteristics including width, shape of the progressive surface, and durometer and bulk modulus of the elastomeric material may be selected to provide various performance characteristics such as dampening effect, impact absorption, approach angle, initial flex force, and service life.

20 Claims, 7 Drawing Sheets

Related U.S. Application Data continuation of application No. 16/201,636, filed on Nov. 27, 2018, now abandoned.

(60) Provisional application No. 62/591,767, filed on Nov. 29, 2017.

(56) References Cited

U.S. PATENT DOCUMENTS

| | | | |
|---|---|---|---|
| 4,489,954 A * | 12/1984 | Yasui | B62B 17/04 |
| | | | 180/190 |
| 4,509,766 A | 4/1985 | Yasui et al. | |
| 4,826,185 A | 5/1989 | Blanchard et al. | |
| 4,865,345 A | 9/1989 | Piegay | |
| 4,917,207 A | 4/1990 | Yasui et al. | |
| 5,358,201 A | 10/1994 | Brown, Sr. | |
| 5,360,220 A | 11/1994 | Simmons | |
| 5,570,857 A | 11/1996 | Landes et al. | |
| 5,845,923 A | 12/1998 | Zanco | |
| 5,858,521 A | 1/1999 | Okuda et al. | |
| 5,876,013 A | 3/1999 | Ott | |
| 5,984,283 A | 11/1999 | Tsuiki et al. | |
| 6,158,747 A * | 12/2000 | Magnani | A63C 5/075 |
| | | | 280/11.14 |
| 6,595,309 B1 | 7/2003 | Savage et al. | |
| 6,955,237 B1 | 10/2005 | Przekwas et al. | |
| 7,374,188 B2 | 5/2008 | Hibbert et al. | |
| 8,177,241 B1 | 5/2012 | Marks et al. | |
| 8,678,868 B2 | 3/2014 | Bailey et al. | |
| 9,809,195 B2 | 11/2017 | Giese et al. | |
| 9,988,067 B1 | 6/2018 | Mangum et al. | |
| 10,322,772 B1 * | 6/2019 | Aberle | B62M 27/02 |
| 2002/0024187 A1 | 2/2002 | Gyr | |
| 2003/0019676 A1 | 1/2003 | Mallette et al. | |
| 2006/0032686 A1 | 2/2006 | Berg | |
| 2006/0185920 A1 | 8/2006 | Hibbert et al. | |
| 2007/0193799 A1 | 8/2007 | Yoshihara et al. | |
| 2011/0278083 A1 | 11/2011 | Yoshihara et al. | |
| 2016/0051884 A1 | 2/2016 | Yi | |
| 2016/0167743 A1 | 6/2016 | Melcher | |
| 2019/0118905 A1 * | 4/2019 | Bergstrom | B62M 29/00 |

OTHER PUBLICATIONS

Polaris Parts Catalog; 2016 Polaris Industries, Inc.; Copyright No. 600359 Design © 2004-2018 by ARI Network Services, Inc.; : https://snowmobiles.polaris.com/en-us/parts 1 page.

* cited by examiner

SNOWMOBILE SKI DAMPENER

CROSS REFERENCES

The present application for patent is a continuation application of U.S. patent application Ser. No. 16/206,627 by Aberle, entitled "SNOWMOBILE SKI DAMPENER", filed Nov. 30, 2018, which is a continuation of U.S. patent application Ser. No. 16/201,636 by Aberle, entitled "SNOWMOBILE SKI DAMPENER", filed Nov. 27, 2018, which claims the benefit of U.S. Patent Application No. 62/591,767 by Aberle, entitled "SNOWMOBILE URETHANE SKI DAMPENER AND POSITIONER", filed Nov. 29, 2017, assigned to the assignee hereof, and each of which is expressly incorporated by reference in its entirety herein.

BACKGROUND

Field of Invention

The present Application relates to a snowmobile ski dampener for dampening articulation between a snowmobile ski and a steering spindle of a snowmobile.

Relevant Background

Snowmobile ski dampeners are used to provide support and articulation control between a steering spindle and a snowmobile ski. Conventional snowmobile ski dampener designs suffer from shortcomings in properly limiting ski travel, providing adequate spindle support or ski stability, or vibration mitigation. These shortcomings lead to erratic and unpredictable ski response and consequently, less driver protection and more driver fatigue. Furthermore, conventional dampeners may also quickly wear out due to their design or the materials used in construction.

SUMMARY

An improved snowmobile ski dampener for dampening articulation between a steering spindle and a snowmobile ski is described. The ski dampener may be constructed of an elastomeric material and include a forward preload surface and a forward progressive surface that are forward of an articulation axis of the steering spindle. The forward preload surface may be in contact with a forward base surface of the steering spindle when the steering spindle and the ski are in a preload condition while the forward progressive surface may not be in contact with the forward base surface of the steering spindle when the steering spindle and the ski are in the preload condition. A first load condition that imparts a compressive load to the elastomeric dampener between the top surface of the ski and the forward base surface of the steering spindle may cause the forward base surface of the steering spindle to contact at least a portion of the forward progressive surface. The portion of the forward progressive surface in contact with the forward base surface of the steering spindle may increase as increasing compressive loads are applied between the top surface of the ski and the forward base surface of the steering spindle.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
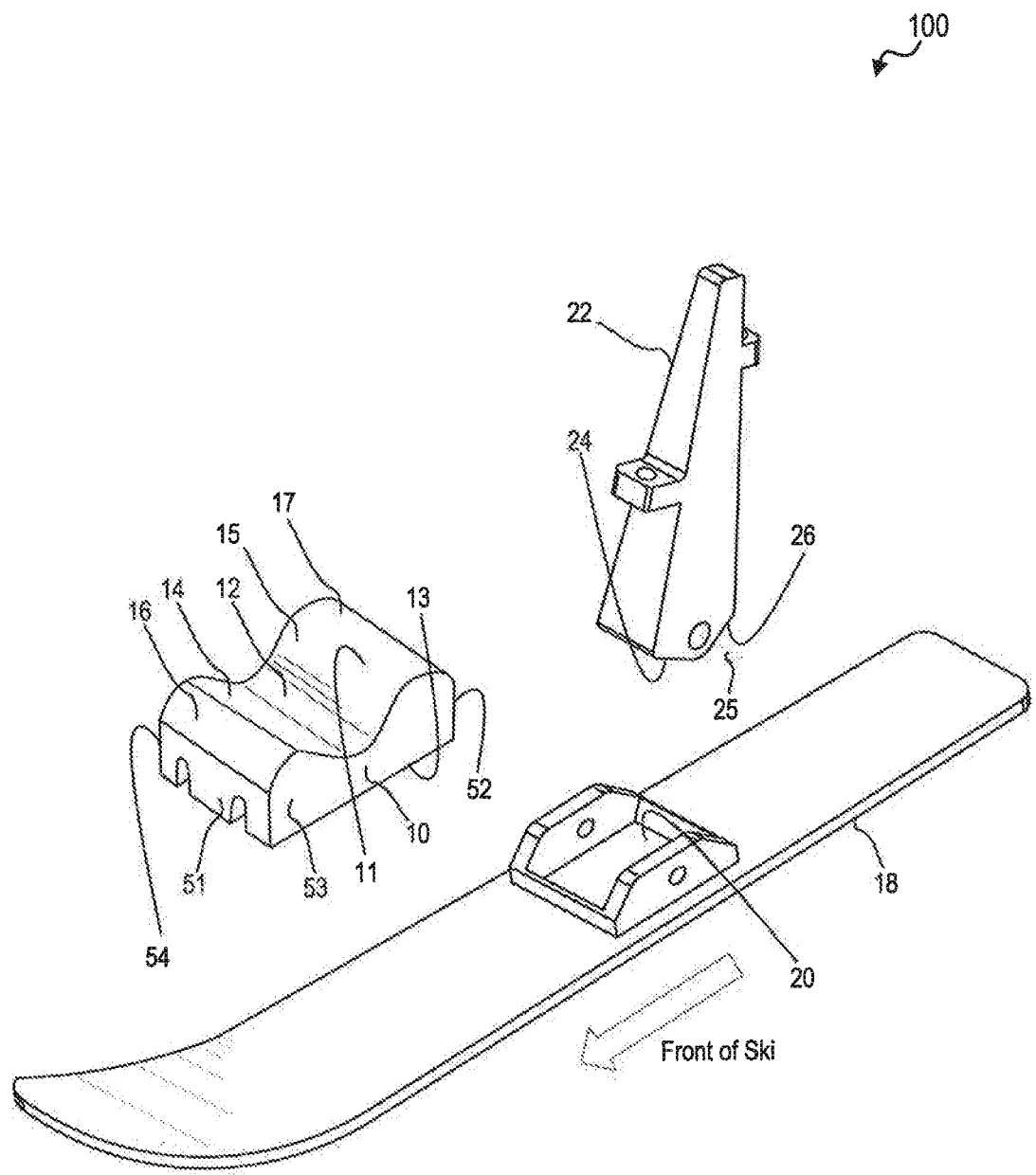
FIG. 1 illustrates a portion of a snowmobile suspension and steering system employing an improved snowmobile ski dampener, according to various aspects of the disclosure.

The described features generally relate to an improved snowmobile ski dampener. Typically, a snowmobile has skis at the front that provide directional control, with a continuous track driven by an engine at the rear to provide propulsion. The front skis are generally connected to the snowmobile chassis via a suspension and steering system, which typically includes articulation arms (A-arms), shock absorbers, and steering spindles. The steering spindle generally rotates on the A-arm to provide steering, while the shock absorber and A-arm provide suspension. The skis are generally connected to the steering spindle at a pivot point, which allows the ski to articulate to adapt to the terrain. A snowmobile ski dampener may be inserted into a saddle of the ski and be in contact with the steering spindle to provide dampening of the ski articulation, as well as improved control and vibration mitigation. Ski dampeners may be constructed of elastomeric materials (e.g., elastic polymers such as urethane elastomer or rubber).

Performance of elastomeric materials may be influenced by durometer, bulk modulus, shape factor, heat build-up, or hysteresis, among other factors. Durometer (e.g., hardness) and bulk modulus (e.g., compressibility) are properties of elastomeric materials. Shape factor is the ratio of loaded surface area to the total area free to bulge. Because elastomers behave like incompressible hydraulic fluids, shape factor may determine the strain produced by a given amount of stress. For example, as the shape factor increases, the strain produced by given stress may decrease. Heat build-up refers to temperature rise within an elastomer body due to hysteresis and the generally low thermal conductivity of elastomers. The physical properties of elastomers may degrade above certain temperatures (e.g., which may be dependent on the type of elastomer). The amount of heat build-up may depend on amplitude of strain and frequency and duration of strain. Hysteresis refers to the percent of energy lost per cycle of deformation. Hysteresis is the result of inter-molecular friction and is caused by conversion of mechanical energy to heat.

Conventional snowmobile ski dampeners may have limitations with regard to spring rate, travel limit, energy absorption, durability. For example, conventional snowmobile ski dampeners may not properly limit the stress-strain of the ski dampener material, which may contribute to premature failure. In addition, the spring rate of conventional snowmobile ski dampeners may be substantially or highly non-linear, which can make the response of the snowmobile ski feel unpredictable to the rider. Some conventional snowmobile ski dampeners may be made of a material with an excessively high durometer (i.e., may be too hard), which may unnecessarily limit the travel of the ski, result in inadequate flex, or increase vibration. These effects may lead to driver fatigue or possibly damage to the ski or steering and suspension system. Conversely, some snowmobile ski dampeners are too soft, which allows the ski to flex too easily and provides insufficient impact absorption. Overly soft ski dampeners may lead to unpredictable ski response, lack of stability, or potential damage to steering and suspension systems. These conditions may be unpredictable, uncomfortable, or dangerous for the rider.

According to various aspects of the present disclosure, a ski dampener includes a preload surface that is in contact (e.g., a substantial part of the surface is in contact) with a base of the steering spindle when in a preload condition relative to the ski, and a radiused or progressive surface, where the progressive surface is not in contact with the base of the steering spindle when in the preload condition. The ski dampener may be constructed of an elastomeric material such as an elastic polymer. As a forward load is applied (a compressive load between the ski and the steering spindle forward of the pivot point between the ski and steering spindle), a portion of the progressive surface comes into contact with the base of the steering spindle, and the portion may increase as the forward load increases. The profile of the progressive surface provides control of the dampening effect (e.g., spring rate) and energy absorption, and may allow the elastomeric material to stay within stress-strain limits, prolonging the service lifetime of the ski dampener.

FIG. 1 illustrates a portion of a snowmobile suspension and steering system employing an improved snowmobile ski dampener, according to various aspects of the disclosure. The illustrated snowmobile suspension and steering system includes a snowmobile ski 18, ski dampener 10, and steering spindle 22. The ski dampener 10 is inserted into in a saddle 20 that is disposed on the top of the snowmobile ski 18 and sits in between the snowmobile ski 18 and the steering spindle 22 when the steering spindle 22 is installed on the snowmobile ski 18. The ski dampener 10 may include a top side 11, bottom side 13, front side 51, rear side 52, left side 53, and right side 54. The top side 11 may include a cradle 12, which may have a curved profile that has a center axis that is the same as the articulation axis 25 of the steering spindle 22 (coupling axis between the steering spindle 22 and the snowmobile ski 18).

The steering spindle 22 may be installed on the snowmobile ski 18 via a bolt (not shown) coupling the steering spindle 22 to the snowmobile ski 18 at the articulation axis 25, with the ski dampener 10 inserted in between the steering spindle 22 and snowmobile ski 18. The bottom side 13 may face the saddle 20 of the ski 18 and the top side 11 may face the steering spindle 22. The front side 51, rear side 52, left side 53, and right side 54 may also face the saddle 20, and may be in contact (e.g., in contact or in close proximity) with the inside walls of the saddle 20. The top side 11 of the ski dampener 10 may include a forward preload surface 14 and a forward progressive surface 16.

In a preload condition, the forward preload surface 14 may be in contact (e.g., at least a substantial portion of the surface may be in contact or in close proximity) with a forward base surface 24 of the steering spindle 22. The preload condition may correspond to the steering spindle 22 being installed on the snowmobile ski 18, but without an external load applied to the snowmobile ski 18 about the articulation axis 25 of the steering spindle 22 (e.g., other than any load due to installation or the snowmobile itself).

In the preload condition, the forward progressive surface 16 may not be in contact with the forward base surface 24 (e.g., or any portion in contact may be small or insubstantial) of the steering spindle 22. The forward progressive surface 16 may be, for example, a curvilinear surface, and the forward preload surface 14 and the forward progressive surface may be non-coplanar surfaces in the preload condition.

If a forward compressive load is applied (e.g., the front of the ski is forced up relative to the steering spindle 22), a portion of the forward progressive surface 16 may come in contact with the forward base surface 24 of the steering spindle 22. As the forward compressive load increases, more of the forward progressive surface 16 may come in contact with the forward base surface 24. Thus, the portion of the ski dampener 10 that is in contact with the forward base surface 24 may increase while the portion of the ski dampener 10 that is free to bulge may decrease. That is, increasing the forward compressive load will increase the shape factor of the ski dampener 10. At a given compressive stress, the increased shape factor will decrease the compressive strain on the ski dampener 10 (as compared to having the same shape factor at the given load). For a plurality of progressively increasing forward load conditions between the top surface of the ski 18 and the forward base surface 24 of the steering spindle 22, the portion of the forward progressive surface 16 in contact with the forward base surface 24 of the steering spindle 22 may increase.

Similarly to the forward preload surface 14 and forward progressive surface 16, the ski dampener may have a rear preload surface 15 and a rear progressive surface 17. In the preload condition, the rear preload surface 15 may be in contact with the rear base surface 26 of the steering spindle while the rear progressive surface 17 may not be in contact with the rear base surface 26 of the steering spindle 22. If a rear compressive load is applied (e.g., the rear of the ski is forced up relative to the steering spindle 22), a portion of the rear progressive surface 17 may come in contact with the rear base surface 26 of the steering spindle 22. As the rear compressive load increases, more of the rear progressive surface 17 may come in contact with the rear base surface 26. Similar to the forward compressive load, the increased shape factor produced by increasing the contact surface and decreasing the area free to bulge may decrease the compressive strain at a given load.

The ski dampener 10 is described herein as having various surfaces (e.g., bottom side 13, front side 51, rear side 52, left side 53, right side 54, forward preload surface 14, rear preload surface 15) that are in contact with the saddle 20 or spindle 22 when the ski dampener 10 is in the preload condition. It should be understood that in this sense, in contact means that the surface is designed to contact or effectively contact surfaces of the saddle 20 or spindle 22 such that they do not contribute to the surface area that is free to bulge within a typical range of loading conditions. However, it should be understood that this is not intended to mean all of the surface has to be in contact in the preload condition and considerations such as manufacturing and assembly tolerances may result in a surface of the ski dampener 10 being proximate to a surface of the saddle 20 or spindle 22 but not in contact during the preload condition. In this case, even though it may be free to bulge a small amount under initial loads, a small load is likely to make the surface be in contact and thus no longer free to bulge throughout a remaining range of loading conditions.

In addition to reducing compressive strain on the ski dampener 10 at a given load, the forward and rear progressive surfaces may provide improved performance for the rider. For example, the shape of the forward and rear progressive surfaces may provide a progressive dampening effect (e.g., the ski is allowed to flex easier at low speeds and low loads, while the difficulty in flexing the ski at high speeds and high loads is increased). While providing progressive dampening, a dampening profile for the ski dampener 10 may be more linear or smoother than for traditional ski dampeners, providing more predictable performance for the snowmobile. For example, conventional ski dampeners may have break points or more abrupt inflection points in their dampening profiles where the incremental load for a given amount of displacement changes noticeably. The ski dampener 10 may feel more linear and smoother as the dampening effect increases, improving the rider experience. Various attributes of the ski dampener may be modified to provide desired performance. For example, the durometer and tensile modulus may be selected for desired ski travel or energy absorption. In addition, the width of the ski dampener 10 may be selected (e.g., in combination with durometer and tensile modulus) based on desired ski travel, energy absorption, and durability. In addition, the angles of the forward and rear preload surfaces may be selected to provide a desired ski angle in the preload condition.

The ski dampener 10 may be formed from an elastic polymer such as a urethane elastomer, or a rubber. The elastic polymer may be homogenous, or, may be formed from two or more elastic polymers having at least one different characteristic (e.g., durometer), in some cases. The ski dampener 10 may be formed using various manufacturing techniques for elastic polymers or rubber materials including cast molding or injection molding.

Figure 2:
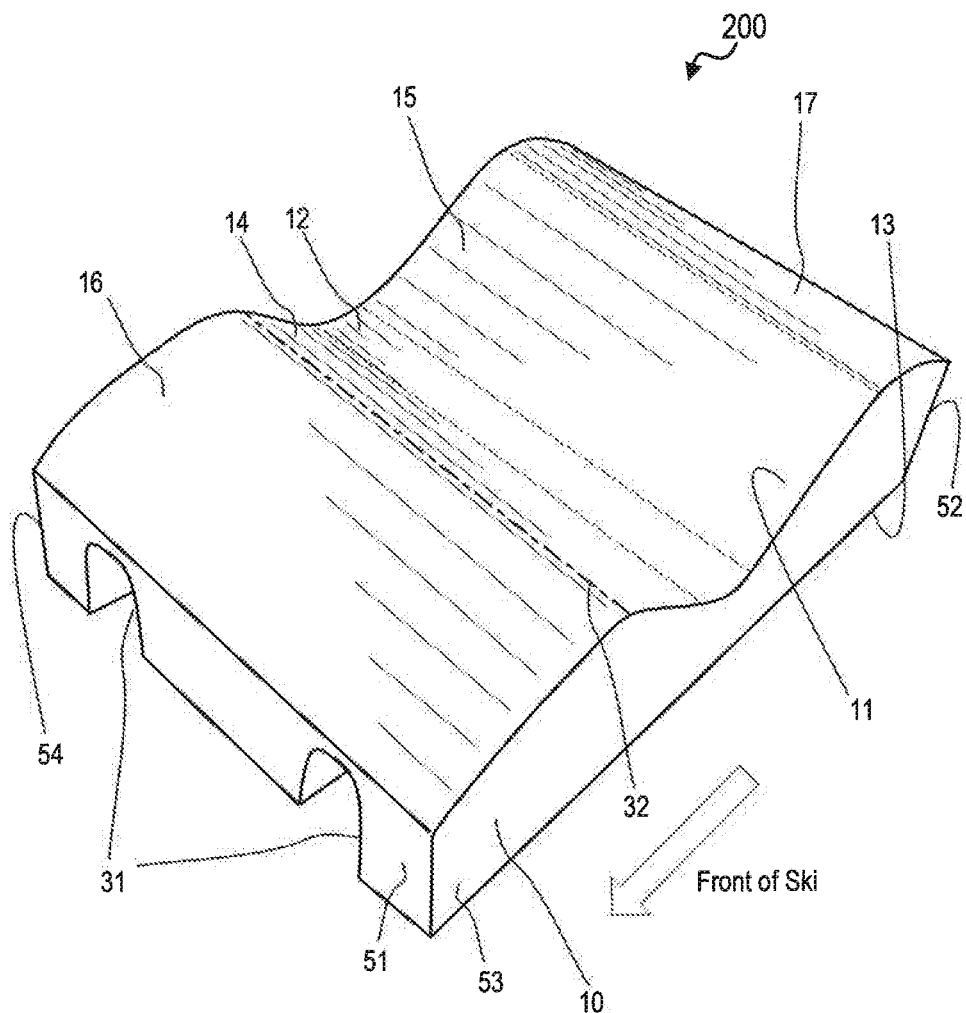
FIG. 2 illustrates a view of an improved ski dampener in greater detail, according to various aspects of the disclosure.

FIG. 2 illustrates a view 200 of an improved ski dampener 10 in greater detail, according to various aspects of the disclosure. The view 200 of the ski dampener 10 shows the top side 11, with the saddle 12, front preload surface 14, front progressive surface 16, rear preload surface 15, and rear progressive surface 17. As discussed with reference to FIG. 1, the bottom side 13 of the ski dampener 10 may sit in a saddle 20 of a snowmobile ski 18 when installed on the ski 18. Some snowmobile skis 18 may have ridges or other features in the saddle 20, and ski dampener 10 may have cutouts 31 to sit over the ridges or other features so that the ski dampener 10 can fill a full width of the saddle 20 (e.g., the left side 53 and right side 54 may be in contact with the inside of the saddle). The front side 51 and rear side 52 may also be in contact with the inside of the saddle 20 when installed on the ski 18.

In view 200, ski dampener 10 is shown in the preload condition. The front preload surface 14, front progressive surface 16, rear preload surface 15, and rear progressive surface 17 may each be curvilinear surfaces. In some examples, the top side 11 may include a surface discontinuity 32 between the forward preload surface 14 and the forward progressive surface 16. That is, when viewed from the side, there may be a discontinuity in a curve defining the outline of the ski dampener 19 between the front preload surface 14 and front progressive surface 16. For example, when viewed from the side, the forward preload surface 14 may have an outline formed by a first function, while the front progressive surface 16 has an outline formed by a second function, and the outlines may meet at the discontinuity 32. The discontinuity 32 may be behind a front edge of the forward base surface 24 of the steering spindle 22. The discontinuity 32 may effectively elongate the front preload surface 14, which may increase the initial compressive stress for causing movement of the ski. This may provide a more solid and secure feel for the rider. Although not shown in the example ski dampener 10 shown in FIG. 2, the ski dampener 10 may also have a surface discontinuity between the rear preload surface 15 and the rear progressive surface 17.

Figure 3A:
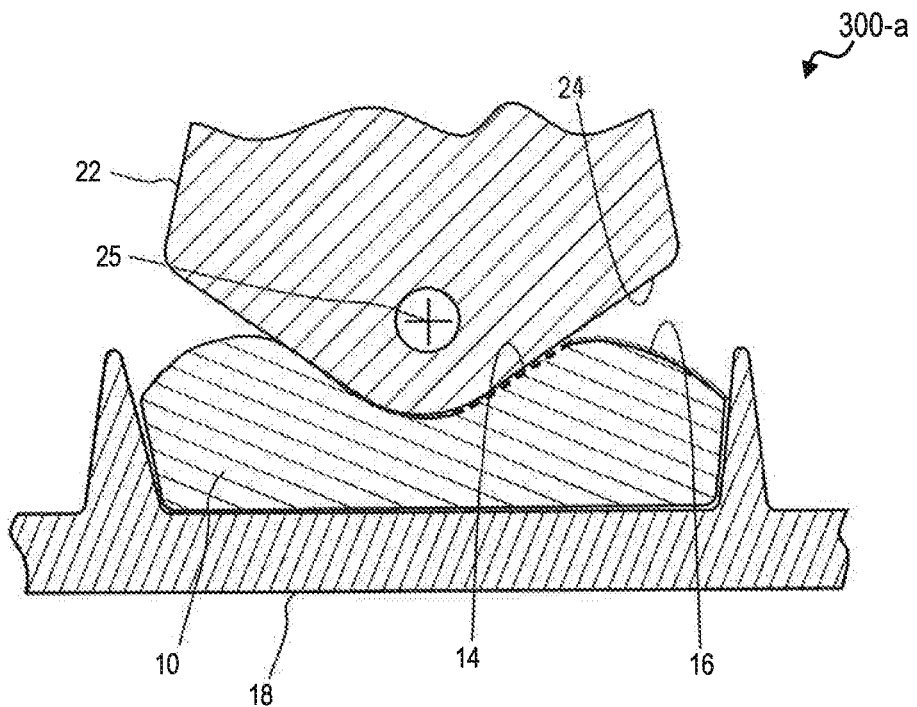
FIGS. 3A-3C show cross-sectional views of a ski dampener installed in between a spindle and a snowmobile ski, according to various aspects of the disclosure.
Figure 3B:
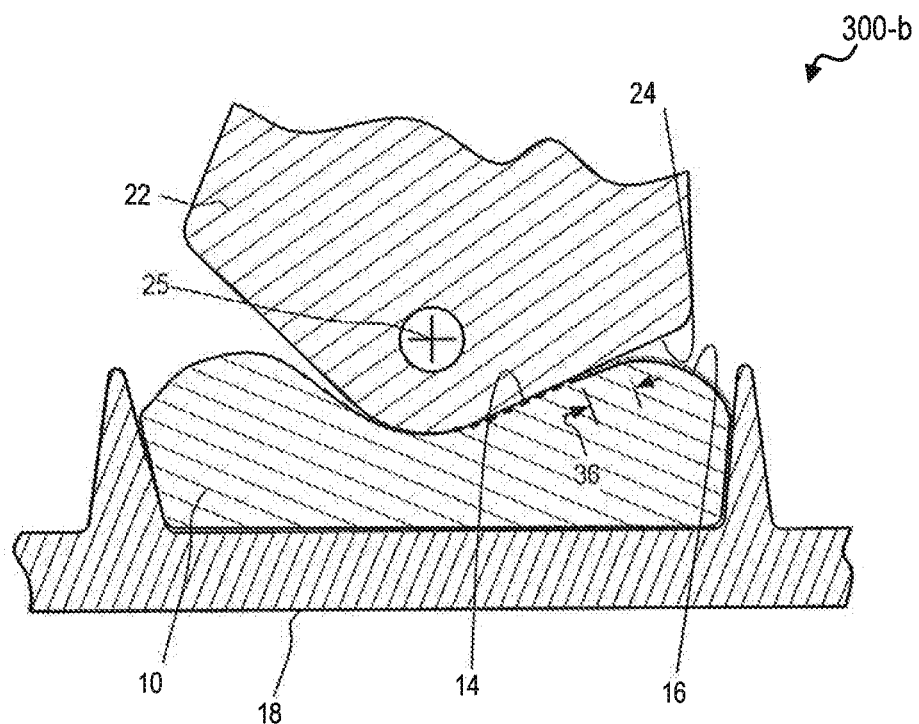
Figure 3C:
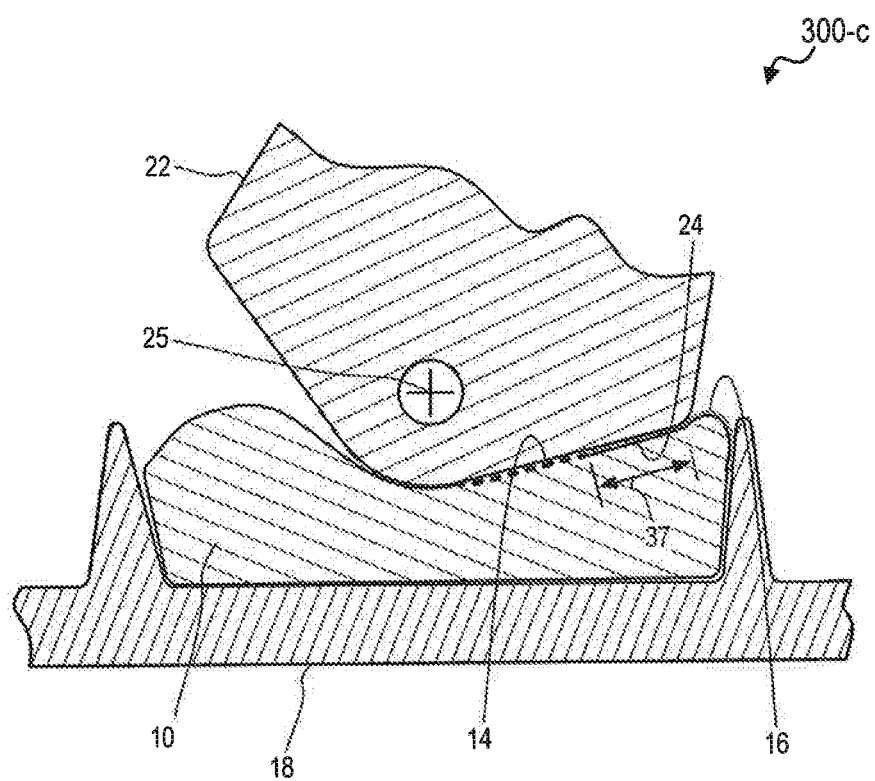

FIGS. 3A-3C show cross-sectional views 300 of a ski dampener 10 installed in between a spindle 22 and a snowmobile ski 18, according to various aspects of the disclosure. Cross-sectional view 300-a of FIG. 3A may illustrate ski dampener 10 in a preload condition (e.g., no external compressive force applied between the snowmobile ski 18 and the spindle 22). In the preload condition, the front preload surface 14 may be in contact with the front base surface 24 of the spindle 22, while the front progressive surface 16 is not in contact with the front base surface 24. In the preload condition, the effective shape factor of the ski dampener 10 may be given by the surface area of the front preload surface 14 relative to the surface area of the front progressive surface 16. In some cases, the effective shape factor of the ski dampener 10 in the preload condition is approximately equal to 1 (e.g., the surface area of the front preload surface 14 is approximately equal to the surface area of the front progressive surface 16).

As a compressive force is applied between a front section (e.g., in front of the articulation axis 25) of the snowmobile ski 18 and the spindle 22, the front base surface 24 of the spindle 22 may begin to impart compressive force on the front preload surface 14. However, the elastomeric material may be incompressible (e.g., substantially incompressible), and thus may deform in a way that the total volume of the elastomeric material does not change. In addition, one or more of the front side, back side, left side, and right side may be in contact with the inner walls of the saddle 20. Thus, the front progressive surface 16 may serve as the area of the ski dampener 10 that is free to bulge. However, as it begins to bulge, at least a portion of the front progressive surface 16 may begin to also come into contact with the front base surface 24 of the spindle 22. The shape factor discussion for the ski dampener 10 above is given for the case where the width of the front base surface 24 of the spindle 22 is equal (e.g., approximately equal) to the width of the ski dampener 10. It should be noted that the front base surface 24 may have a smaller width than the saddle 20, which results in some portions of the front preload surface 14 and front progressive surface 16 that are outside the width of the front base surface 24 of the spindle 22 and therefore also free to bulge. In addition, one or more of the front side, back side, left side, or right side may not be designed to be in contact with the saddle 20, which may result in these surfaces, or some portions of them, also being free to bulge. Although these conditions are not accounted for in the shape factor discussion for the ski dampener 10 above, it may be taken into account when selecting the geometric or material characteristics of the ski dampener 10.

Cross-sectional view 300-b of FIG. 3B may illustrate ski dampener 10 in a first loading condition. For example, the first loading condition may be caused by a compressive force between a front section (e.g., in front of the articulation axis 25) of the snowmobile ski 18 and the spindle 22. As illustrated in cross-sectional view 300-b, the spindle 22 may be rotated about articulation axis 25 as compared with cross-sectional view 300-a.

Under the first loading condition, in addition to the front preload surface 14, at least a portion 36 of the front progressive surface 16 may be in contact with the front base surface 24 of the spindle 22. In the first loading condition, the effective shape factor of the ski dampener 10 may be given by the surface area of the front preload surface 14 in addition to the portion 36 of the front progressive surface 16 that is in contact with the front base surface 24 of the spindle 22 relative to the surface area of the portion of the front progressive surface 16 that is not in contact with the front base surface 24 of the spindle 22. Thus, the effective shape factor of the ski dampener 10 may increase in the first loading condition as compared with the preload condition.

Figure 4:
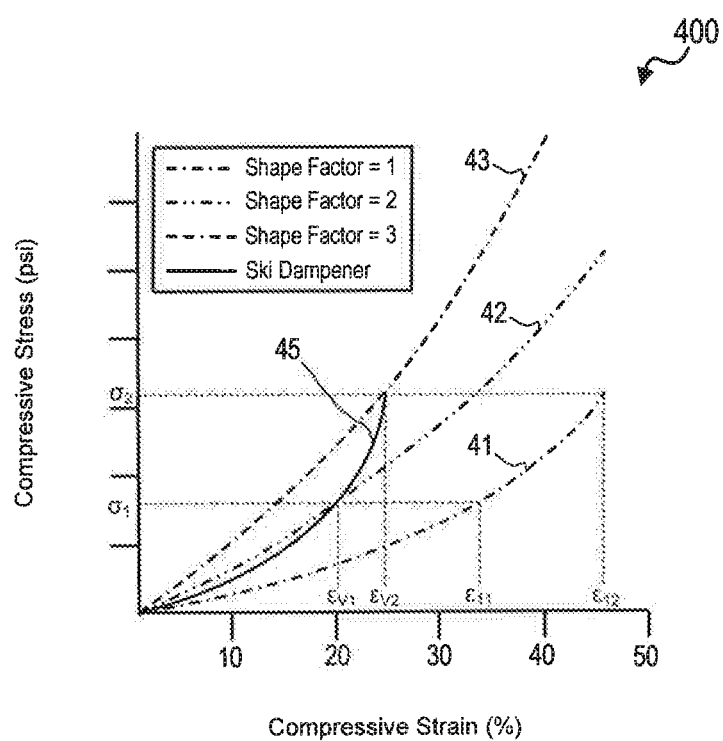
FIG. 4 shows a chart illustrating stress-strain curves for an example elastomeric material for a ski dampener, according to various aspects of the disclosure.

FIG. 4 shows a chart 400 illustrating stress-strain curves for an example elastomeric material for a ski dampener, according to various aspects of the disclosure. Chart 400 shows example stress-strain curves for various shape factors including stress-strain curve 41 for a shape factor of one (1), stress-strain curve 42 for a shape factor of two (2), and stress-strain curve 43 for a shape factor of three (3). In addition, chart 400 shows stress-strain curve 45 for a variable shape factor ski-dampener such as the ski dampener 10 of FIGS. 1-3C.

In FIG. 4, the preloading condition may correspond to having low or nominal compressive stress, thus the stress-strain may be illustrated as near the origin. In the preload condition, the shape factor of the ski dampener 10 may be approximately 1, meaning that the surface area of the front preload surface 14 may be approximately equal to the surface area of front progressive surface 16. However, these dimensions are provided for the purposes of example, and other ratios are contemplated and within the present scope for these surfaces.

In the first loading condition the compressive three on the ski dampener 10 may be given by $\sigma_1$. As can be seen from FIG. 4, if the shape factor on the ski dampener 10 remains approximately 1, the strain may be given by $\epsilon_{11}$. However, the variable shape factor of the ski dampener 10 may result in a shape factor of approximately 2 for the compressive stress $\sigma_1$. Thus, the strain on the ski dampener may result in a strain of $\epsilon_{V1}$, which may be substantially lower than $\epsilon_{11}$. Accordingly, although the compressive stress may have increased substantially between the preload condition and the first loading condition, the amount of increase in the compressive strain may be reduced as compared to an elastomeric material where the shape factor does not change (e.g., intentionally change, or change substantially) under load.

Cross-sectional view 300-c of FIG. 3C may illustrate ski dampener 10 in a second loading condition. For example, the second loading condition may be caused by an increase in the compressive force between the front section (e.g., in front of the articulation axis 25) of the snowmobile ski 18 and the spindle 22 as compared to the first loading condition. As illustrated in cross-sectional view 300-c, the spindle 22 may be rotated further about articulation axis 25 as compared with cross-sectional view 300-b.

Under the second loading condition, in addition to the front preload surface 14, at least a second portion 37 of the front progressive surface 16 may be in contact with the front base surface 24 of the spindle 22. In the second loading condition, the effective shape factor of the ski dampener 10 may be given by the surface area of the front preload surface 14 in addition to the portion 37 of the front progressive surface 16 that is in contact with the front base surface 24 of the spindle 22 relative to the surface area of the portion of the front progressive surface 16 that is not in contact with the front base surface 24 of the spindle 22. Thus, the effective shape factor of the ski dampener 10 may increase in the second loading condition as compared with the preload condition and the first loading condition.

In the second loading condition the compressive force on the ski dampener 10 may be given by $\sigma_2$. As can be seen from FIG. 4, if the shape factor on the ski dampener 10 remains approximately 1, the strain may be given by $\epsilon_{12}$. However, the variable shape factor of the ski dampener 10 may result in a shape factor of approximately 3 for the compressive stress $\sigma_2$. Thus, the strain on the ski dampener may result in a strain of $\epsilon_{V2}$, which may be substantially lower than $\epsilon_{12}$. Accordingly, although the compressive stress may have increased substantially between the preload condition and the second loading condition, the amount of increase in the compressive strain may be reduced as compared to an elastomeric material where the shape factor does not change (or change substantially) under load. In some examples, the shape factor may change by a factor of 2 or more under various load conditions. Additionally, the compressive strain may be limited by the change in shape factor to below approximately 35%, 30%, 25%, or 20%, in some examples. It should be noted that the shape factors for the first and second preload conditions are provided by way of example, and other ranges of shape factors for various loading conditions are within the scope of the present disclosure.

Some elastomeric materials may, for example, have limitations with respect to compressive strain, and repeatedly exceeding the compressive strain limit may result in failure of the material (e.g., tearing, crumbling). The variable shape factor of the ski dampener 10 may be designed in a way that limits the compressive strain to stay below a limit of a given material. For example, for a material with a given compressive strain limit (e.g., 25%), the ski dampener 10 may be designed to increase the shape factor in response to compressive stress such that the compressive strain stays below the compressive strain limit. For example, the shape and surface area of the front preload surface 14 and the front progressive surface 16 may be varied to provide different stress-strain curves having different shape factors for a given compressive stress.

The performance characteristics of the ski dampener 10 may include dampening effect, impact absorption, approach angle, initial flex force, and service life. Dampening effect is the amount of articulation of the snowmobile ski 18 relative to the spindle 22 for a given compressive force. The dampening effect may be, for example, linear or non-linear, and may be what the rider notices most about the ski dampener 10 because it translates to how predictable the ski feels on the snow. Another performance characteristic is the impact absorption, which is the amount of force the ski dampener will absorb before allowing the snowmobile ski 18 to bottom out against the spindle 22. Higher impact absorption helps protect the ski and spindle, as well as other parts of the snowmobile such as articulation arms, steering linkages, and the like. Approach angle and initial flex force determine the relationship of the snowmobile ski to the spindle in the preload condition, and the amount of force required to begin to compress the dampener. Approach angle and initial flex force may, for example, effect how solid and predictable the steering feels to the rider. The service life of the ski dampener 10 may be determined by the compressive strain limit of the material, and how often and by how much the limit is exceeded in service.

The design characteristics of the ski dampener 10 include the width, the surface area of the front preload surface 14, the surface area of the front progressive surface 16, the shape of the front progressive surface 16, the shape of the transition between the front preload surface 14 and the front progressive surface 16, and the durometer and bulk modulus of the elastomeric material. These design characteristics may be varied to provide different performance characteristics. For example, the width and durometer may be varied to change the dampening effect and impact absorption of the ski dampener 10. In another example, the surface area of the front preload surface 14 and the surface area of the front progressive surface 16 may be varied to change the initial shape factor, which will affect the amount the ski articulates at a given compressive force. In yet another example, a surface discontinuity (e.g., surface discontinuity 32) may be used to change the initial shape factor (e.g., increase the shape factor in the preload condition). In contrast, ski dampeners 10 without a surface discontinuity may have a lower initial shape factor but may have similar performance for higher compressive stresses.

Although the description of FIGS. 3A-3C discusses the design and performance characteristics related to the front of the ski dampener 10, it should be understood that similar design characteristics related to the rear preload surface 15 and rear progressive surface 17 may be varied to provide similar or different performance characteristics in rear articulation of the snowmobile ski 18 relative to the spindle 22. For example, the rear preload surface 15 may be behind (e.g., relative to the ski direction) the articulation axis of the steering spindle 22 and in contact with the rear base surface 26 of the steering spindle 22 when the steering spindle 22 and the ski 18 are in the preload condition. The rear progressive surface may be behind (e.g., relative to the ski direction) of the rear preload surface 15 and not in contact with the rear base surface 26 of the steering spindle 22 when the steering spindle 22 and the ski 18 are in the preload condition. The rear base surface 26 of the steering spindle 22 may contact at least a portion of the rear progressive surface 17 in a second loading condition of the steering spindle 22 and the ski 18, the second loading condition imparting a compressive load to the elastomeric dampener 10 between the top surface of the ski 18 and the rear base surface 26 of the steering spindle 22. For a plurality of progressively increasing reverse load conditions imparting progressively increasing compressive loads to the elastomeric dampener 10 between the top surface of the ski 18 and the rear base surface 26 of the steering spindle 22, the portion of the rear progressive surface 17 in contact with the rear base surface 26 of the steering spindle 22 may increase.

Figure 5:
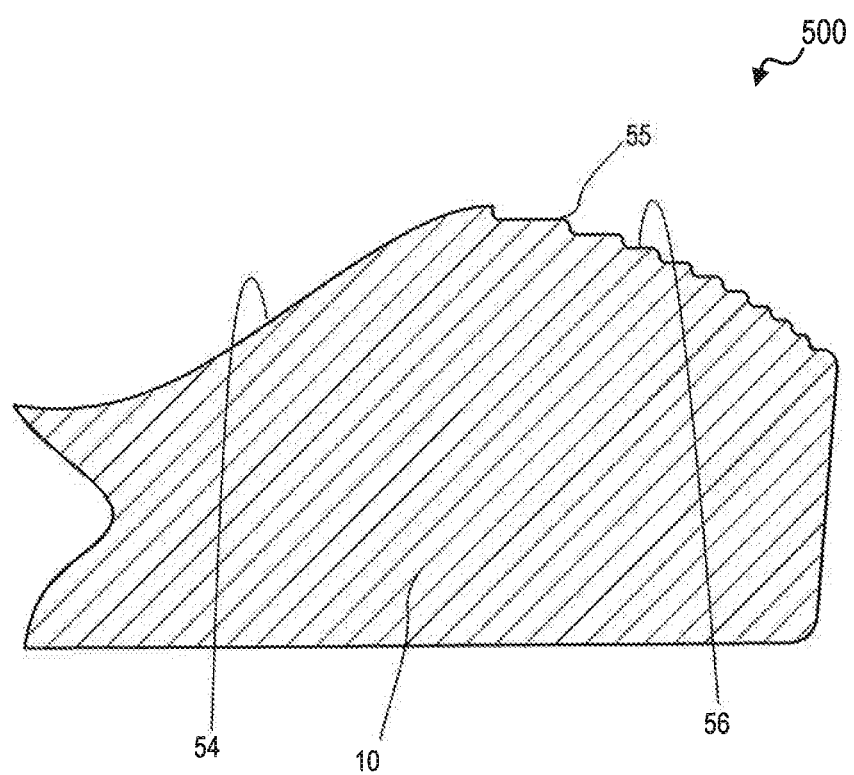
FIG. 5 shows a cross-sectional view of a portion of a ski dampener, according to various aspects of the disclosure.

FIG. 5 shows a cross-sectional view 500 of a portion of a ski dampener 10, according to various aspects of the disclosure. Cross-sectional view 500 shows the outline of the front preload surface 14 and an alternative example of the front progressive surface 56. In this example, front progressive surface 56 includes a series of steps 55, which have an effective profile similar to that of front progressive surface as illustrated in FIGS. 1-3C. In some examples, the front progressive surface 56 may include at least one inflection point.

In the preload condition, the effective shape factor of the ski dampener 10 may be given by the surface area of the front preload surface 14 relative to the surface area of the front progressive surface 56. As compressive loading increases on the illustrated portion of the ski dampener 10, the elastomeric material may deform and a portion of the steps 55 may contact the base of the steering spindle 22. Thus, the shape factor for ski dampener 10 illustrated in FIG. 5 may also increase as the compressive loading increases, reducing the strain for a given amount of stress. The number and size of the steps may be varied along with other design factors discussed above to provide different performance characteristics.

Figure 6:
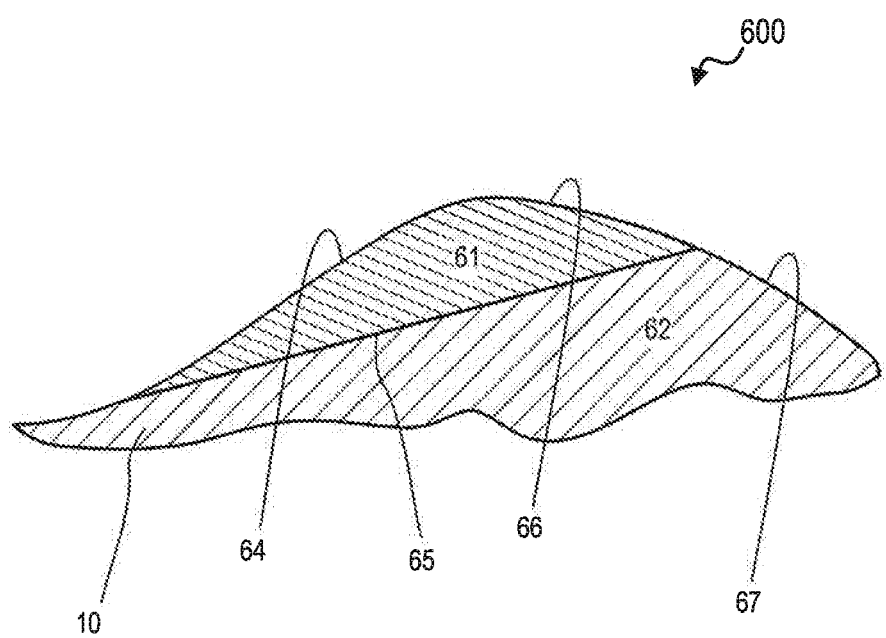
FIG. 6 shows a cross-sectional view of a portion of a ski dampener, according to various aspects of the disclosure.

FIG. 6 shows a cross-sectional view 600 of a portion of a ski dampener 10, according to various aspects of the disclosure. Cross-sectional view 600 illustrates an example ski dampener 10 including a plate 65 between two portions of elastomeric material. The two portions of elastomeric material may include, for example, a first portion 61 and a second portion 62. The first portion 61 may be formed from the same elastomeric material or a different (e.g., have at least on different characteristic such as durometer) elastomeric material as the second portion 62. For example, the first portion 61 may be formed from a first elastic polymer while the second portion 62 is formed from a second elastic polymer. The plate 65 may be, for example, a rigid plate, and may be formed from plastic or metal. In some examples, the first portion 61 includes a forward preload surface 64 and a forward progressive surface 66. The second portion 62 may include a bulge area 67 that continues to be free to bulge throughout a dampening range of the ski dampener 10 (e.g., non-progressive surface). For the first portion 61, the shape factor may increase with increasing compressive loads as described above, while the shape factor for the second portion 62 may remain constant or substantially constant. The plate 65 may reduce strain where the initial shape factor for the ski dampener 10 is relatively low.

The detailed description set forth above in connection with the appended drawings describes exemplary embodiments and does not represent the only embodiments that may be implemented or that are within the scope of the claims. The term "example" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

The functions described herein may be implemented in various ways, with different materials, features, shapes, sizes, or the like. Other examples and implementations are within the scope of the disclosure and appended claims. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

As used in the present disclosure, the terms "parallel," "orthogonal," or "perpendicular" are not intended to suggest a limitation to precise geometric parallelism. For instance, the term "parallel" as used in the present disclosure is intended to include typical deviations from geometric parallelism relating to such considerations as, for example, manufacturing and assembly tolerances. Further, certain manufacturing process such as molding or casting may require positive or negative drafting, edge chamfers and/or fillets, or other features to facilitate any of the manufacturing, assembly, or operation of various components, in which case certain surfaces may not be geometrically parallel, but may be parallel in the context of the present disclosure.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the widest scope consistent with the principles and novel features disclosed herein.

The invention claimed is:

1. An elastomeric dampener for dampening articulation between a steeling spindle and a ski of a snowmobile, comprising:
    a first preload surface forward of an articulation axis between the steering spindle and the ski when the elastomeric dampener is installed between the steering spindle and the ski, the first preload surface in contact with a first surface of one of the steering spindle or the ski when the steering spindle and the ski are in a preload condition; and
    a first progressive surface, the first progressive surface forward of the first preload surface and not in contact with the first surface of the one of the steering spindle or the ski when the steering spindle and the ski are in the preload condition, wherein the first surface of the one of the steering spindle or the ski contacts at least a portion of the first progressive surface in a first load condition of the steeling spindle and the ski, the first load condition imparting a compressive load to the elastomeric dampener between the ski and the steering spindle.

2. The elastomeric dampener of claim 1, wherein, for a plurality of progressively increasing load conditions between the ski and the steering spindle, the portion of the first progressive surface in contact with the first surface of the steering spindle increases.

3. The elastomeric dampener of claim 1, wherein, in the preload condition, the elastomeric dampener has a first shape factor and in the first load condition the elastomeric dampener has a second shape factor that is higher than the first shape factor.

4. The elastomeric dampener of claim 1, wherein the elastomeric dampener comprises:
    a second preload surface, the second preload surface in back of the articulation axis of the steering spindle and in contact with a second surface of the one of the steering spindle or the ski when the steering spindle and the ski are in the preload condition;
    a second progressive surface, the second progressive surface in back of the second preload surface and not in contact with the second surface of the one of the steering spindle or the ski when the steering spindle and the ski are in the preload condition, wherein the second surface of the one of the steeling spindle or the ski contacts at least a portion of the second progressive surface in a second load condition of the steering spindle and the ski, the second load condition imparting a compressive load to the elastomeric dampener between the ski and the steering spindle.

5. The elastomeric dampener of claim 4, wherein, for a plurality of progressively increasing reverse load conditions, the portion of the second progressive surface in contact with the second surface of the one of the steering spindle or the ski increases, the plurality of progressively increasing reverse load conditions imparting progressively increasing compressive loads to the elastomeric dampener between the ski and the steering spindle.

6. The elastomeric dampener of claim 1, wherein, in the preload condition, the first preload surface and the first progressive surface are non-coplanar surfaces.

7. The elastomeric dampener of claim 1, wherein, in the preload condition, the first progressive surface comprises a curvilinear surface.

8. The elastomeric dampener of claim 1, wherein, in the preload condition, the first progressive surface comprises a plurality of stepped surfaces.

9. The elastomeric dampener of claim 1, wherein, in the preload condition, the first progressive surface comprises at least one inflection point.

10. The elastomeric dampener of claim 1, wherein the elastomeric dampener is formed from a urethane elastomer.

11. The elastomeric dampener of claim 1, wherein the elastomeric dampener is formed from a rubber.

12. The elastomeric dampener of claim 1, wherein the elastomeric dampener is formed from an elastic polymer.

13. The elastomeric dampener of claim 12, wherein the elastic polymer is homogenous.

14. The elastomeric dampener of claim 12, wherein the elastic polymer comprises two or more elastic polymers having at least one different characteristic.

15. The elastomeric dampener of claim 1, wherein the elastomeric dampener is cast molded or injection molded.

16. The elastomeric dampener of claim 1, wherein, in the preload condition, the elastomeric dampener comprises a surface discontinuity between the first preload surface and the first progressive surface.

17. The elastomeric dampener of claim 16, wherein, in the preload condition, the surface discontinuity is behind a front edge of the first surface of the one of the steering spindle or the ski.

18. The elastomeric dampener of claim 1, wherein the elastomeric dampener comprises a plate, the plate between a first portion of the elastomeric dampener and a second portion of the elastomeric dampener.

19. The elastomeric dampener of claim 18, wherein the first portion of the elastomeric dampener comprises a first elastic polymer and the second portion of the elastomeric dampener comprises a second, different elastic polymer.

20. The elastomeric dampener of claim 18, wherein the plate is a rigid plate.

* * * * *